United States Patent
Audibert et al.

(10) Patent No.: US 6,710,107 B2
(45) Date of Patent: Mar. 23, 2004

(54) CEMENT SLURRIES COMPRISING HYDROPHOBIC POLYMERS

(75) Inventors: Annie Audibert, Croissy sur Seine (FR); Christine Noïk, Le Pecq (FR); Alain Rivereau, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/779,857

(22) Filed: Feb. 9, 2001

(65) Prior Publication Data

US 2001/0020057 A1 Sep. 6, 2001

(30) Foreign Application Priority Data

Feb. 10, 2000 (FR) .............................. 00 01687

(51) Int. Cl.⁷ .............................. C04B 24/26
(52) U.S. Cl. .................. 524/5; 524/2; 524/4; 523/130; 523/131; 507/120
(58) Field of Search ................ 523/130, 131; 524/2, 4, 5; 507/120

(56) References Cited

U.S. PATENT DOCUMENTS

| 4,525,500 | A | * | 6/1985 | Lynn .............................. 524/5 |
| 4,662,942 | A | * | 5/1987 | Koga et al. ..................... 524/5 |
| 4,888,059 | A | * | 12/1989 | Yamaguchi et al. ............ 524/5 |
| 5,597,783 | A | * | 1/1997 | Audibert et al. ............ 507/120 |
| 5,637,556 | A | * | 6/1997 | Argillier et al. ............ 507/120 |
| 5,707,445 | A | * | 1/1998 | Yamato et al. ................. 524/5 |
| 6,235,814 | B1 | * | 5/2001 | Bowe ............................. 524/5 |
| 6,277,900 | B1 | * | 8/2001 | Oswald et al. ................ 524/5 |

* cited by examiner

*Primary Examiner*—Peter Szekely
(74) *Attorney, Agent, or Firm*—Antonelli, Terry, Stout & Kraus, LLP

(57) ABSTRACT

The present invention relates to a cement slurry set in a wellbore. The slurry comprises cement, at least one mineral filler, water and a determined amount of at least one hydrophobically modified acrylamide or acrylate derivative.

The present invention also relates to an additive specific to a cement slurry and acting as a filtrate reducer and as a rheological control agent, the additive comprising mainly a hydrophobically modified acrylamide or acrylate derivative.

5 Claims, 4 Drawing Sheets

CEMENT SLURRIES COMPRISING HYDROPHOBIC POLYMERS

FIELD OF THE INVENTION

The present invention notably relates to operations carried out in order to develop underground reservoirs containing hydrocarbons. More particularly, the invention describes a cementing method wherein the cement formulation is optimized in order to control the fluid filtration losses in a geologic formation during setting of the cement slurry in a well. Furthermore, the formulation of the cement slurry is optimized in that the additive used to control filtration also provides good control of the rheology of the slurry, thus favouring excellent setting in the well, generally around a tube to be cemented.

BACKGROUND OF THE INVENTION

When a cement slurry is placed in contact with a porous geologic formation, a phenomenon of intrusion of an aqueous part of the slurry in the pores of the formation generally occurs. This phenomenon is generally referred to as filtration. This lost amount of the slurry composition is referred to as filtration loss or filtrate. It is desirable to limit the loss, notably the water loss of a slurry because this loss can alter its physico-chemical properties, its rheological properties for example. The pumpability characteristics and/or the setting characteristics of the slurry can change significantly. Too fast setting of the cement or setting alteration due to a decrease in the water content required for the various chemical reactions allowing setting of the cement is obviously detrimental to the operation allowing the slurry to be set in the well and to the mechanical properties of the cement after setting. This filtration through a porous formation can also lead to well wall destabilization risks or to clogging of the productive or potentially productive geologic zones. Additives specific to cement slurries, acting as filtrate reducers, are then added to the slurry in order to limit filtration, for example by reducing the filtration rate in order to limit the water loss of the cement in the formation.

It is clear that these filtrate reducing products for cement slurries are specific to the formulation of the slurry insofar as the solid content is high and as the physico-chemical characteristics of the slurry evolve by definition in the formation during solidification.

Many filtrate reducing products for cement slurries are known in the trade. Finely divided mineral particles or hydrosoluble polymers such as sulfonated polyacrylamide derivatives or HEC (hydroxyethylcellulose) are for example used. However, the polymers used in the trade are highly sensitive to the high temperatures that can be encountered in the subsoil and thus lose their initial properties.

SUMMARY OF THE INVENTION

The present invention thus relates to a cement slurry intended to be set in a wellbore through at least one geologic formation having a certain permeability. The slurry according to the invention comprises cement, at least one mineral filler, water and a determined amount of at least one polymer with hydrophilic (Hy) and hydrophobic (Hb) units in aqueous solution, the hydrophobic units (Hb) containing C1 to C30 alkyl, aryl, alkyl-aryl groups, the polymer having the following structure: —(Hb)—Hy)— with a statistical distribution, and:

Hy has the following form:

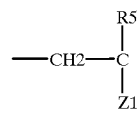

where R5 is H or CH3, Z1 is COOH or CONH2 or CONHR1SO3⁻ or CONHR"1, R"1 is CH3;

Hb has the following form:

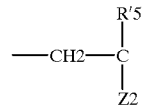

where R'5 is H or CH3 and Z2 is COOR7, COOR'1, CONR1R'1 or CONR1R7, R7 being a non-ionic surfactant consisting of an alkyl polyoxyethylene chain, R1 is H or a C1-C30 alkyl, aryl or alkyl-aryl radical, and R'1 is aC1-C30 alkyl, aryl or alkyl-aryl radical.

According to a variant, the polymer can have a weight average molecular weight ranging between $10^4$ and $10^7$ daltons and a proportion of hydrophobic units Hb ranging between 0.5 and 60%.

The polymer according to the invention can be selected from the group consisting of:

HMPAM where R5 is H and Z1 is CONH2, R'5=CH3, Z2 is COOR'1 with R'1=C9H19, and

Hb1 where Pa is H, Z1 is COOH, R'5 is H and Z2 is COOR'1 with R'1 is C4.

The polymer according to the invention may also be S1, S2 having units of

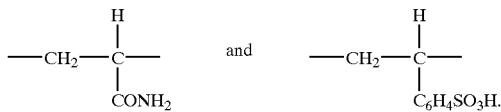

The mineral filler can consist of silica whose grain size distribution range is between 5 and 200 µm and microsilica whose grain size distribution range is between 0.1 and 20 µm.

Polymer S1 or S2 can be combined with polymer HMPAM.

According to the invention, the slurry can comprise, alone or in admixture, at least one of the polymers from the group described above.

The polymer can be Hb1 polymer at a concentration ranging between 0.5 and 5% by weight.

The invention also relates to an additive for cement slurry, characterized in that it essentially comprises a polymer with hydrophilic (Hy) and hydrophobic (Hb) units in aqueous solution, as described above.

The polymers used in the present invention have at least a higher filtration control efficiency in relation to the known acrylic synthetic polymers. In relation to the other polymers conventionally used, the polymers according to the invention have a good capacity for controlling the filtration of cement slurries even at high temperatures.

The claimant has brought to light that the polymer defined above has good qualities for controlling filtration of a cement slurry, which is a fluid whose liquid phase is aqueous. The slurry circulating in a well or set in the well by circulation can comprise viscosifiers based on reactive clays and/or polymers of specific nature for fulfilling notably the function of viscosifier. For certain applications, the slurry can comprise other mineral fillers, for example silica, silica fumes, barite, etc., in order to modify the rheological and physical characteristics of the slurry. The additives thus selected can be used within a wide E/C content range which defines the amount of water in relation to the hydraulic binder.

The polymer according to the present invention surprisingly shows a better high-temperature strength than the polymers commonly used for this application. This allows to use the polymer of the present invention in much wider areas of application.

A slurry is a fluid that is displaced in a well in order to be set in a production well. As it is displaced or set, this slurry is in contact for a more or less long time with the productive or potentially productive geologic formation.

The physical and/or chemical characteristics of these slurries are controlled and adjusted according to the nature of the geologic formation and of the effluents present, to the bottomhole conditions and to the various roles that can be fulfilled by such fluids, for example sealing, pressure control, etc. Furthermore, these fluids must as far as possible not modify the productivity of the productive geologic layer, i.e. not irreversibly reduce the permeability of the productive formation. In any case, filtration control is a very important parameter. Rheology control is also very important because the pressure undergone by the formation as the slurry is set therein must remain lower than the fracture pressure of the formation.

The derivatives used according to a varaint of the present invention have a good filtration control capacity, in combination or not with certain viscosifying polymers, all the more so as the temperature increases. This is generally not the case with the polymer derivatives conventionally used as filtrate reducers in slurry formulations, which degrade and lose their efficiency with the temperature.

The following examples will show the characteristics of various derivatives under different conditions of use and according to conventional test procedures. The various cement slurries and their different formulations are described in <<Well Cementing Developments in Petroleum Science>>, 28, ed. E. B. Nelson, Elsevier 1990. The filtrate reducers conventionally used in cement slurries are HEC (Hydroxy Ethyl Cellulose) or sulfonated acrylamide derivatives. The latter are marketed under the brand name Halad by the Halliburton company (USA) and described in patents U.S. Pat. No. 4,557,763 or U.S. Pat. No. 4,703,801. The slurry characterization tests were carried out according to the API (American Petroleum Institute) standards in force: API SPEC 10-88, section 5-Slurry preparation, section 9-Consistometer measurements, Appendix F-Filtration. The filtrates are given in milliliters (ml), the setting times in hours.

The various examples of polymers according to the invention that were used in the following tests are hydrophobically modified acrylamide derivatives (HMPAM), acrylamide/styrene sulfonate copolymers, branched or not, denoted by S1 and S2, an acrylate/butyl acrylate copolymer, denoted by Hb1.

Description of the products:

HMPAM: acrylamide (Hy)/nonyl methacrylate (Hb) copolymer, according to the description above, with R5=H, Z1 is CONH2, R'5=CH3, Z2 is COOR'1 with R'1=C9H19; it can have a weight averge molecular weight of about $8 \cdot 10^6$ daltons and a hydrophobe (Hb) proportion ranging between 0.5 and 1.5%;

S1, S2: acrylamide/styrene sulfonate copolymers, branched or not, having units of

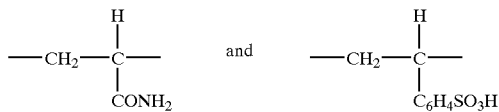

and having a molar ratio of about 50/50 and a weight average molecular weight ranging between 500,000 and $5 \cdot 10^6$ daltons. S1 is not branched, S2 is branched. The branching agent used is N,N' methylene bis acrylamide MBA;

Hb1: acrylate (Hy)/butyl acrylate (Hb) copolymer, where R5 is H, Z1 is COOH, R'5 is H and Z2 is COOR'1 with R'1 being C4, comprising about 80% acrylic acid units, and a weight average molecular weight ranging between $10^4$ and $5 \cdot 10^4$ daltons.

BRIEF DESCRIPTION OF THE DRAWINGS

Other features and advantages of the present invention will be clear from reading the description of the examples hereafter, with reference to the accompanying drawings wherein.

DETAILED DESCRIPTION

Series 1

Various slurry formulations were tested, with or without addition of retarding additives. The formulation is generally based on Class G type cement, to which silica S8 is added, and mixed with 41.3% water according to the API procedure. The polymer(s) used as filtrate reducers are previously hydrated for 16 hours, then added to the slurry so as to obtain a given concentration x in %. The mixture is homogenized with a mixer for 15 s at low speed, then for 35 s at high speed. A retarder is added to the slurry at a concentration ranging between 0.2 and 1%, after measuring the setting time at various temperatures so as to adjust this time to the temperature tests. Warming up of the slurry for filtration is carried out by means of the Halliburton consistometer for 20 min.

The formulations according to the invention were compared with conventional formulations containing filtrate reducers known in the trade, such as HEC (hydroxy ethyl cellulose), which can currently be regarded as one of the best available products, Halad 344, a polyacrylamide derivative marketed by the Halliburton company (USA).

Conditions: API standard,

Base formulation FB of the slurry:

| | |
|---|---|
| G type cement | 100 g, |
| Silica S8 | 40 g, |
| Distilled water | 41.3 cc., |
| CFR-3 | 0.25 g (dispersing additive - Halliburton), |
| HR-15 | 0.7 g (setting retarding additive - Halliburton). |

The pumpability time is defined as the time required for setting the cement slurry in the well with a minimum time of 2 hours before it can no longer be circulated.

|  | Pumpability time (minutes) at 140° C. | Rheology 20, 60 and 80° C. |
|---|---|---|
| Additive to FB |  |  |
| (1) — | 141 |  |
| (2) S1 at 0.2 g | 172 |  |
| (3) S1 at 0.4 g | 246 | (FIG. 1) |

Figure 1:
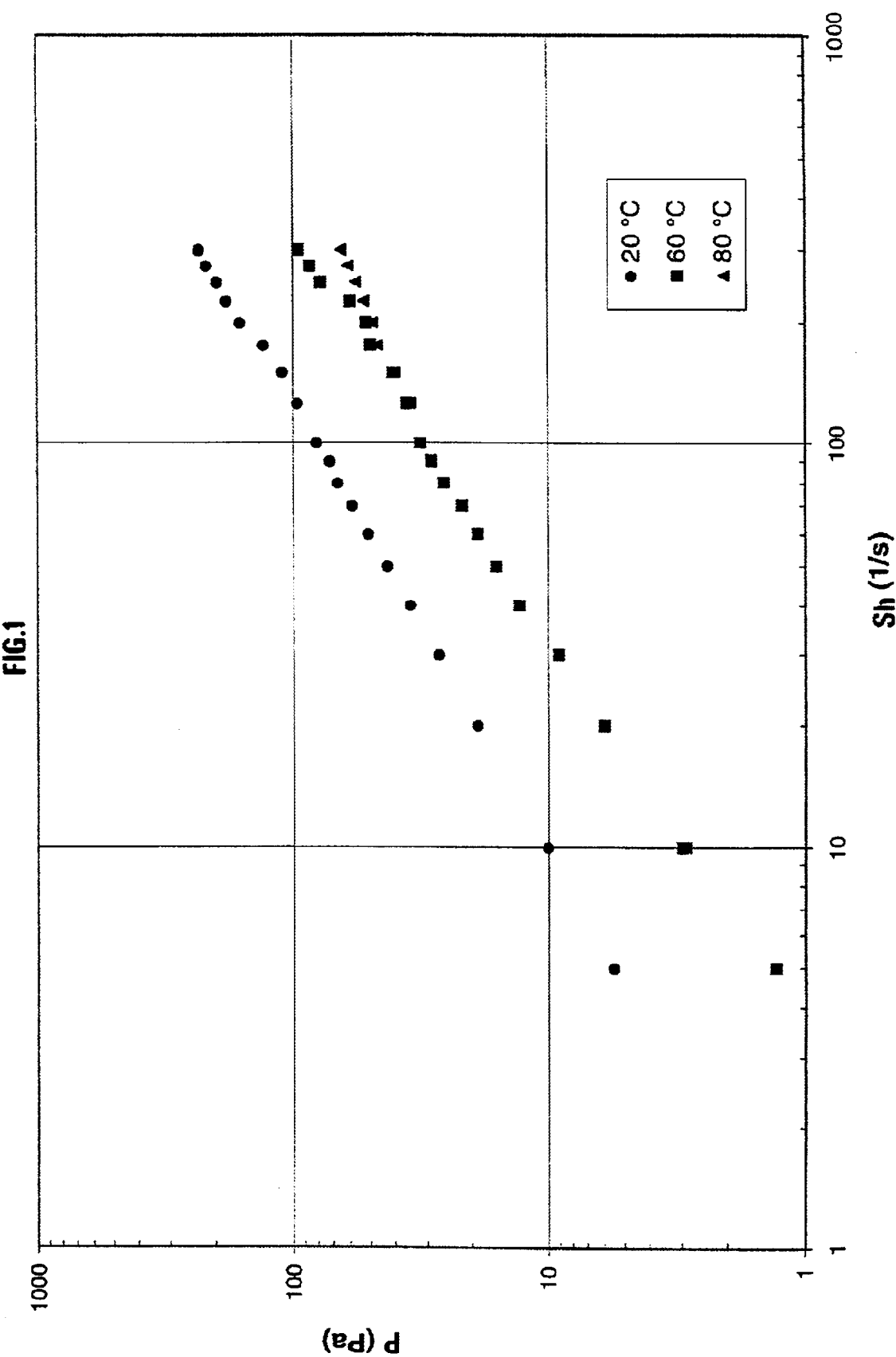
FIGS. 1 to 4 show the rheology variation (stress (P) according to the shear (Sh)) according to the temperature of cement slurries according to the invention.

NB: These measurements show that the high-temperature setting time (140° C.) can be adjusted by adjusting the concentration of the additives according to the invention. The rheological properties of the slurry thus defined meet the criteria of the trade (FIG. 1).

|  | Filtrate (cc) 90° C. | Filtrate (cc) 120° C. | Rheology 20, 60, 80° C. |
|---|---|---|---|
| Additive to FB |  |  |  |
| (1) — | >200 | — |  |
| (1a) Hal 344 | 127 | >200 |  |
| (4) S2 at 0.2 g | 30 | — |  |
| (6) S2 at 1 g | — | 175 |  |
| (7) S2 at 0.5 g/ HMPAM at 0.5 g | — | 33 |  |
| (8) S1 at 0.5 g/ HMPAM at 0.5 g | — | 23.8 | (FIG. 2) |
| (9) HMPAM at 1 g | — | >200 |  |

Figure 2:
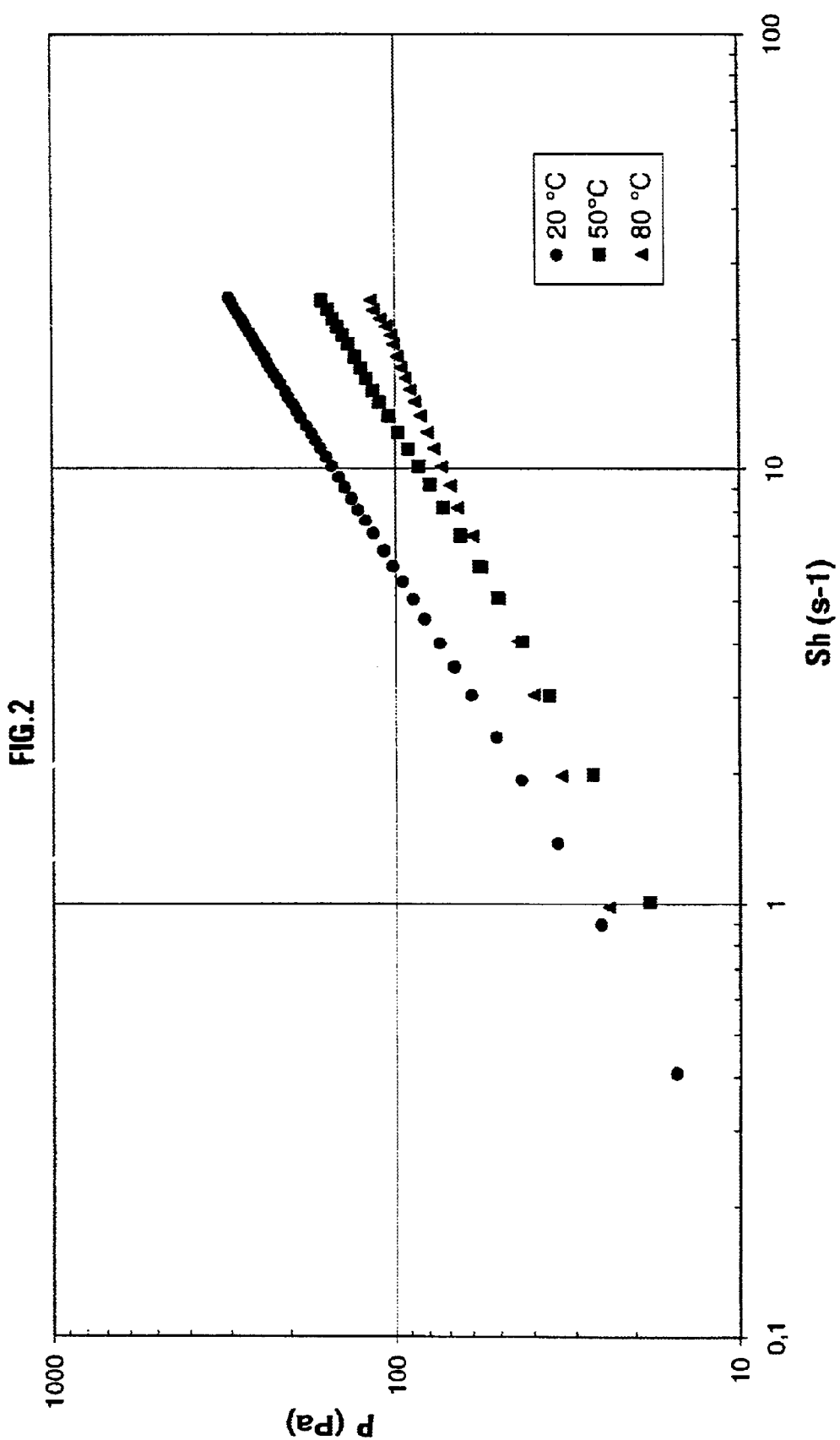

NB: The suitable combination of HMPAM type polymers and of S1 or S2 gives excellent results in terms of filtrate control and rheology for a high temperature, up to 120° C. The slurry thus formulated has a higher viscosity level (FIG. 2).

It has been checked that the rheological properties can also be adjusted to the well conditions by optimizing the concentration of the dispersing additive of CFR-3 type.

Series 2

For this second series relative to examples of slurries with low water contents, the various mineral fillers are dry mixed; the additives are prepared in aqueous solution and the mixture of the two of them is homogenized in a mixer for a few minutes at low speed, then for 35 seconds at high speed.

Conditions: API standard,

| Base formulation FB: |  |
|---|---|
| G type cement | 100 g, |
| Silica C4 | 20 g, |
| Microsilica MST | 24 g, |
| Distilled water | 30 cc., |
| Dispersing additive Disal | 1.75 g (Handy Chemicals), |
| Setting retarder HR-15 | 0.7 g (Halliburton). |

The pumpability time is defined as above.

|  | Pumpability time (minutes) at 80° C. |
|---|---|
| Additive to FB |  |
| (1) — | 206 |
| (1a) Hallad 344 | 125 |
| (1b) HR 15 | 100 |
| (2) Hb1 at 4% | 90 |

Figure 3:
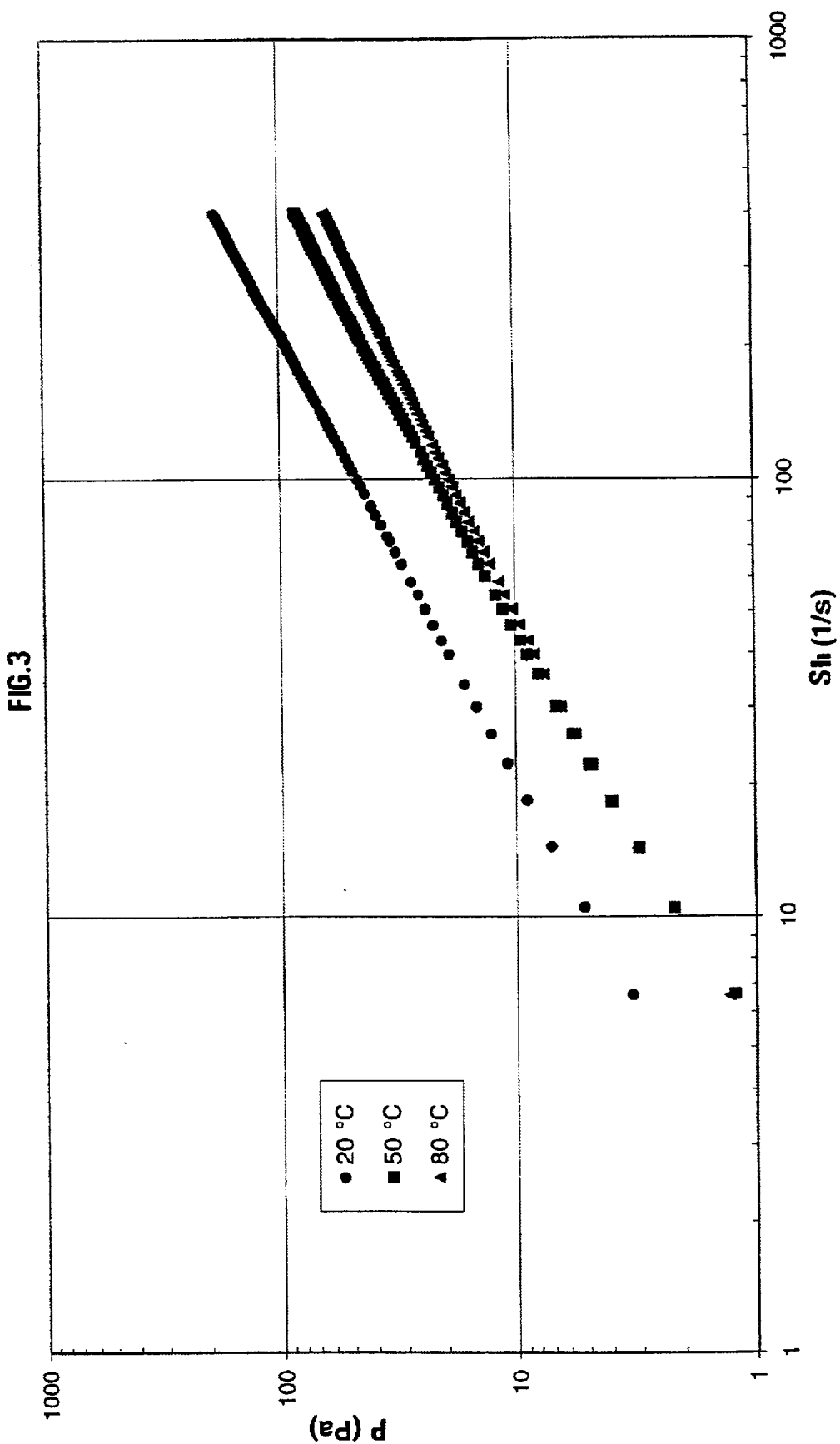
Figure 4:
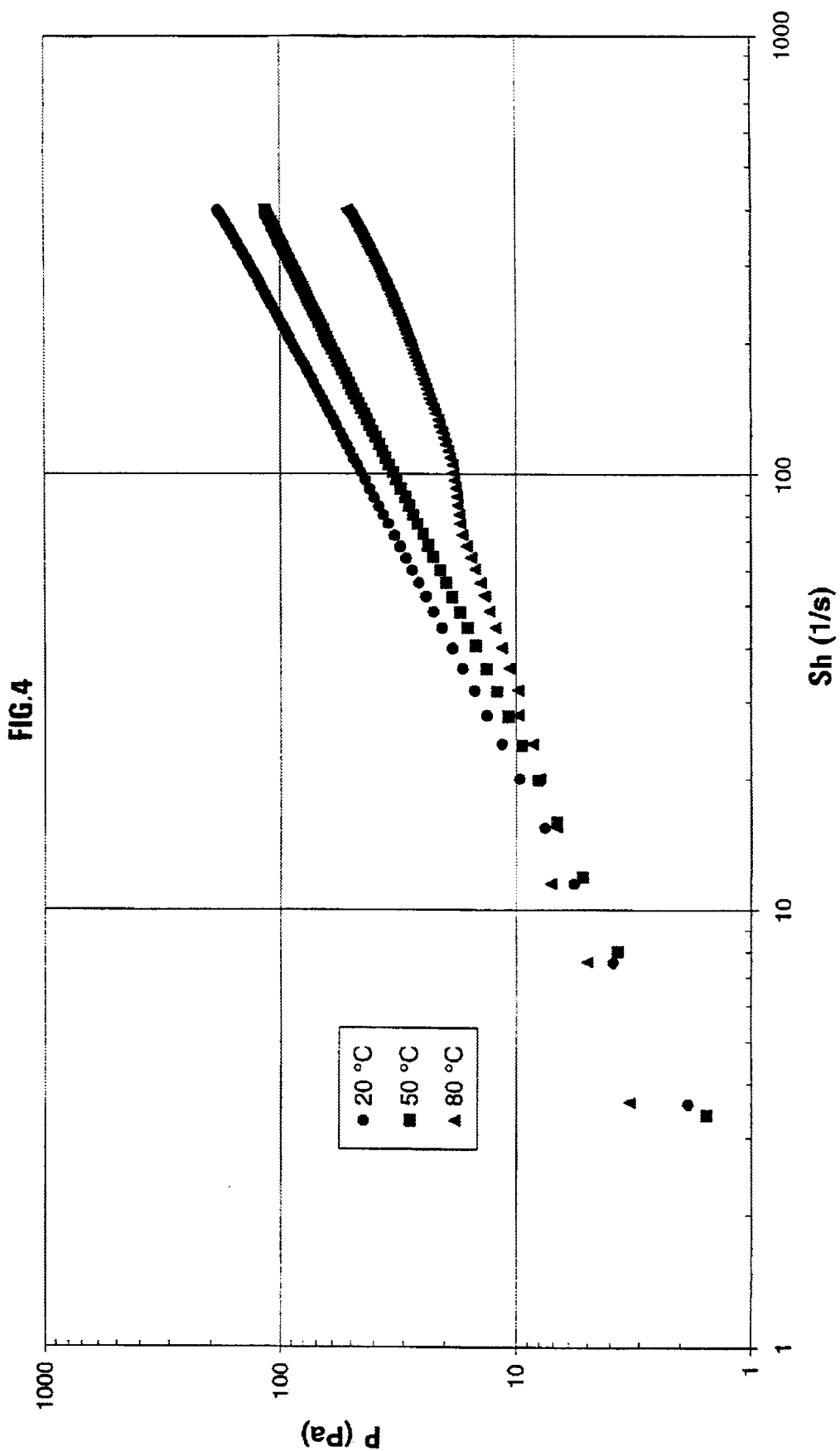

|  | Filtrate (cc) at 90° C. | Rheology 20, 60 and 80° C. |
|---|---|---|
| Additive to FB |  |  |
| (1) — | 100 |  |
| (1a) Hallad 344 | 75 |  |
| (2) Hb1 at 4% | 5 | (FIG. 3) |
| (3) Hb1 at 3% | 22 |  |
| (4) Hb1 at 1% | 35 | (FIG. 4) |
| (5) Hb1 at 5% | <3 |  |

NB: The effect of the Hb1 type polymer concerning filtrate control is clearly positive. It can be seen that the suitable concentration of product Hb1 allows the filtrate to be adjusted at 90° C. Similarly, the viscosity of the slurry can be lowered by means of derivative Hb1, which allows to limit the pressure drops during circulation in the well. The additive thus used has very important characteristics for rheology and filtrate control.

What emerges from these tests is that, according to the conditions of use, notably with a temperature that can reach 120° C., optimization of the cement formulation is possible by selecting notably a polymer according to the invention having a suitable molecular mass and hydrophobic chain length.

What is claimed is:

1. A cement slurry intended to be set in a wellbore through at least one geologic formation having a certain permeability, characterized in the cement slurry comprising cement, at least one mineral filler consisting of silica with a grain size distribution ranging between 5 and 200 μm, water and a determined amount of a copolymer, designated as HMPAM, having hydrophilic (Hy) and hydrophobic (Hb) units in aqueous solution, said copolymer having the following structure: —(Hb)—(Hy)— with a statistical distribution, wherein Hy has the following form:

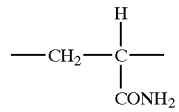

and
HB has the following form:

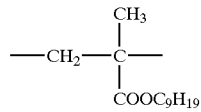

where said copolymer has weight average molecular weight of between $8 \cdot 10^6$ and $10^7$ daltons.

2. The cement slurry of claim 1, wherein said copolymer has a proportion of hydrophobic units ranging from between 0.5 and 60%.

3. A cement slurry intended to be set in a wellbore through at least one geologic formation having a certain permeability, characterized in that it comprises cement, at least one mineral filler consisting of silica with a grain size distribution ranging between 5 and 200 $\mu$m, water and a copolymer, designated as Hb1, having hydrophilic (Hy) and hydrophobic (Hb) units in aqueous solution, said copolymer having the following structure: —(Hb)—(Hy)—with a statistical distribution, wherein Hy has the following form:

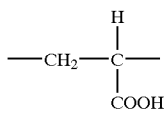

and Hb has the following form:

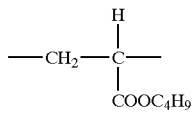

wherein said copolymer has a weight average molecular weight of between $10^4$ and $5 \cdot 10^4$ daltons and wherein the proportion of Hy units is about 80% and wherein said copolymer is contained In the cement slurry in a concentration ranging between 0.5 and 5% by weight and wherein the cement slurry has a water/cement ratio of 3:10 by weight.

4. A cement slurry intended to be set in a wellbore through at least one geologic formation having a certain permeability, characterized in that it comprises cement, at least one mineral filler consisting of silica with a grain size distribution ranging between 5 and 200 $\mu$m, water and a copolymer selected from the group of copolymers designated as S1 and S2 wherein S1 is a copolymer having units of

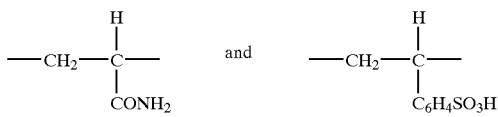

with a molar ratio of about 50/50, in aqueous solution, with a statistical distribution, wherein said copolymer has a weight average molecular weight of between $5 \cdot 10^5$ and $5 \cdot 10^6$ daltons, and wherein S2 is a branched copolymer having the same units as S1, in aqueous solution, with a statistical distribution, wherein said copolymer has a weight average molecular weight of between $5 \cdot 10^5$ and $5 \cdot 10^6$ daltons and wherein the branched copolymer is formed by using N,N' methylene bis acrylamine (MBA) as a branching agent.

5. The slurry of claim 1, wherein the slurry further contains a copolymer selected from the group of copolymers designated as S1 and S2 wherein S1 is a copolymer having units of

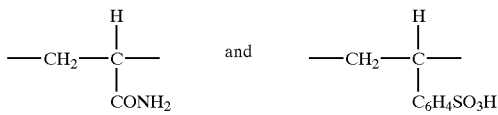

with a molar ratio of about 50/50, in aqueous solution, with a statistical distribution, wherein said copolymer has a weight average molecular weight of between $5 \cdot 10^5$ and $5 \cdot 10^6$ daltons, and wherein S2 is a branched copolymer having the same units as S1, in aqueous solution, with a statistical distribution, wherein said copolymer has a weight average molecular weight of between $5 \cdot 10^5$ and $5 \cdot 10^6$ daltons and wherein the branched copolymer is formed by using N,N' methylene bis acrylamine (MBA) as a branching agent.

* * * * *